United States Patent [19]

Erismann

[11] 4,029,275

[45] June 14, 1977

[54] ANCHORING ASSEMBLY FOR A MACHINE BASE

[75] Inventor: Oskar Erismann, Baden, Switzerland

[73] Assignee: BBC Brown Boveri & Company Limited, Baden, Switzerland

[22] Filed: Apr. 9, 1976

[21] Appl. No.: 675,262

[30] Foreign Application Priority Data

May 7, 1975 Switzerland .................. 5868/75

[52] U.S. Cl. ...................... 248/25; 52/707; 248/500
[51] Int. Cl.² ............... F16B 5/02; F16B 39/00
[58] Field of Search ............ 248/25, 23, 500; 52/704, 705, 706, 707, 711, 710, 709, 105; 151/41.7

[56] References Cited

UNITED STATES PATENTS

| | | | |
|---|---|---|---|
| 1,708,091 | 4/1929 | Healy | 52/709 |
| 1,734,215 | 11/1929 | Kinard | 248/23 |
| 1,761,800 | 6/1930 | Preis | 52/704 X |
| 2,954,647 | 10/1960 | Kai Lee | 52/707 |
| 3,401,733 | 9/1968 | Circle | 52/711 X |

FOREIGN PATENTS OR APPLICATIONS

| | | | |
|---|---|---|---|
| 664,178 | 6/1963 | Canada | 52/707 |
| 812,789 | 4/1959 | United Kingdom | 248/23 |

Primary Examiner—J. Franklin Foss
Attorney, Agent, or Firm—Toren, McGeady and Stanger

[57] ABSTRACT

A foundation anchor for fastening the base of a machine upon a foundation is equipped with a vertically extending anchor bolt movable in its axial direction, with a clamping nut being provided for attaching the base of the machine to the anchor bolt at the upper end thereof. The bottom of the anchor bolt is pivotally mounted within a cavity which extends beneath the upper surface of the foundation and compensating rings, having a wedge-shaped sectional configuration taken in the axial direction, are provided between the base of the machine and the clamping nut.

2 Claims, 1 Drawing Figure

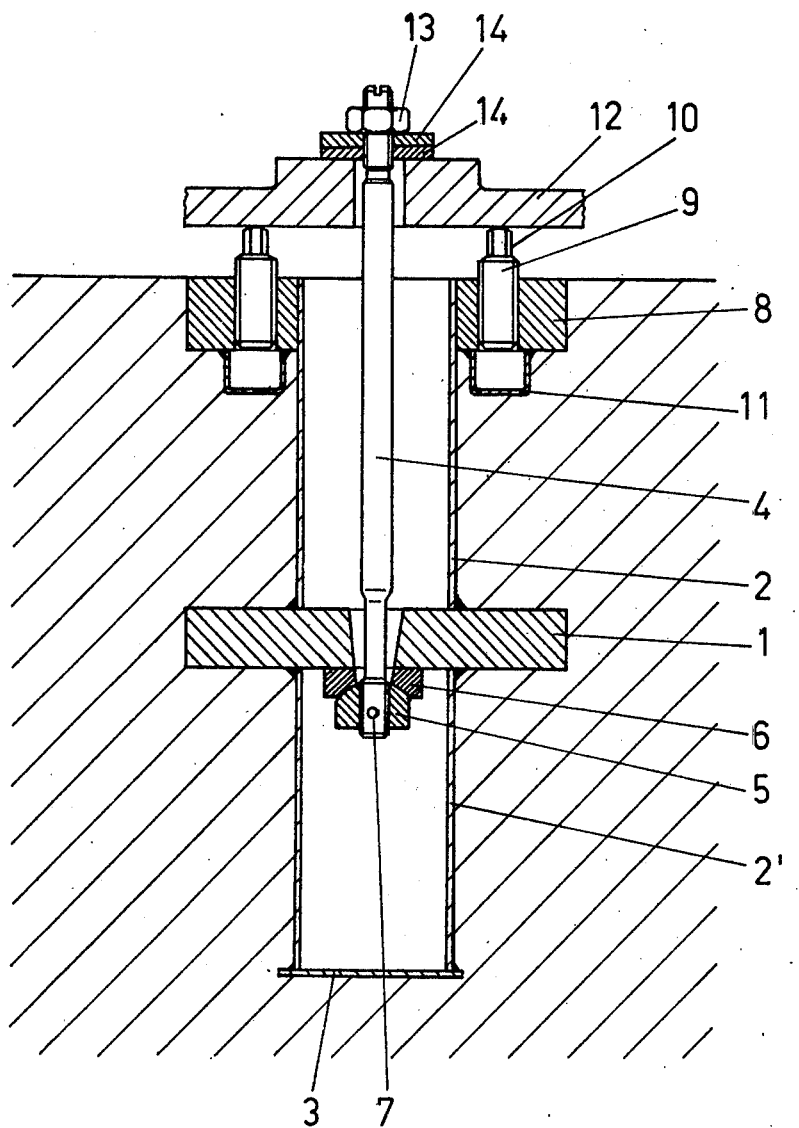

ANCHORING ASSEMBLY FOR A MACHINE BASE

BACKGROUND OF THE INVENTION

The present invention relates generally to an anchoring device for fastening the base of a machine onto a foundation. More particularly, the invention is directed to the type of device which includes an anchor bolt movable in the axial direction.

When mounting machines in place, the connecting means which are located between the machine and the ground upon which the machine rests is the machine foundation which comprises the body upon which the machine is installed. In operation, machines generally produce variable forces of different types. These may include inertia forces, shocks or other effects due to the energy output of the machine, and irregularities in the movements of the machine. Such variable forces are conducted into the foundation and through the foundation into the ground upon which the machine rests. The function of the foundation is to operate as a supporting construction in order to, first of all, secure as accurately as possible the bearing shafts of coupled units and to maintain them in place. Additionally, these functions include the necessity for maintaining the machine set in as stable a manner as possible during its operation and to prevent, as far as possible, the effects of unavoidable interacting forces originating from the setting of the machine.

Machine foundations are frequently made of concrete.

Large machines are usually placed upon their foundations by rollers which enable the machine to be located by gliding movement thereof. This operation usually requires a planar foundation having no projecting parts in order not to impede movement of the machine during its placement at a desired position. It is not customary to place machines directly upon a concrete foundations but instead it is more usual to support them by suitable means such as bolts or the like.

In order to fasten a machine upon its foundation, foundation anchors are generally utilized which provide the function of securing the machine against horizontal and vertical displacement. Foundation anchors of the type referred to are described, for example, in German DOS No. 2,304,132.

Presently known foundation anchors require adherence to exact dimensional tolerances in their use. In order to effect such exacting dimensional requirements, elaborate calculations are necessary. Furthermore, it is usually necessary in the production of the foundation to provide large recesses. After such a foundation has hardened, the foundation anchors are inserted into these recesses and they are connected by struts in order to achieve a high degree of accuracy with regard to the dimensional factors involved. The cavities or recessess are filled with concrete and the hardening time of the concrete is usually in the neighborhood of about four weeks. The struts applied between the foundation anchors are removed after the concrete has set and hardened.

Despite the elaborate and time-consuming operations which must be performed, dimensional discrepancies in one or more of the foundation anchors can not be avoided. If one or another foundation anchor exhibits dimensional discrepancies, it then becomes necessary to repeat the application of the concrete and the start of the assembly is delayed by virtue of the hardening or setting time of the concrete.

It is an object of the present invention to provide a foundation anchor of the aforementioned type which does not involve the inconveniences inherent in known anchors and which may be used simultaneously with the production of the foundation.

SUMMARY OF THE INVENTION

Briefly, the present invention may be described as a foundation anchor for fastening machines upon foundations comprising a vertically extending anchor bolt movable in its axial direction, a clamping nut for attaching the base of the machine to the anchor bolt, means pivotally mounting said anchor bolt within said foundation at the bottom end thereof and compensating means provided between the base of the machine and the clamping nut. The compensating means may be a pair of rings having a wedge-shaped sectional configuration taken in the axial direction thereof.

The invention overcomes many of the problems of prior art devices in that the anchor bolt is mounted for pivotal movement about the lower point of action of the forces applied thereto and that the compensating means are provided between the machine base and the clamping nut.

For attaching the machine on the foundation it is advantageous to sink the anchor bolt to within a cavity lined by a pipe extending below the surface level of the foundation. In order to pivot the anchor bolt about the lower point of action of the forces applied thereto it is particularly suitable to provide a spherical joint type of device consisting of a nut and a washer each having a spherical end face. Means for enabling vertical adjustment of the machine base may be advantageously provided and a device consisting of a plate having bolts vertically adjustable therein is deemed particularly suitable. Since the concrete upon which the machine is to be mounted tends to shrink somewhat upon hardening, the device for the vertical adjustment of the machine is preferably only tacked on so that the tacking or connecting points may be detached under the action of force and the device for the vertical adjustment bears upon the concrete.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWING

The drawing is a cross sectional elevation of an embodiment of the present invention consisting of a foundation anchor with a wide tolerance range.

DETAIL DESCRIPTION OF THE PREFERRED EMBODIMENT

Referring now to the drawing there is shown a foundation anchor assembly embodying the present invention which includes a metal plate 1 provided with a continuous conical bore extending therethrough and having secured thereto a pipe 2, 2' extending coaxially to the bore with the lower part 2' of the pipe being provided with a bottom 3. Within the pipe 2 there is arranged an anchor bolt 4 which extends through the conical bore in the metal plate 1. On the bottom end of the anchor bolt there is screwed a nut 5 having a convex spherical end face. Arranged on the anchor bolt 4 between the metal plate 1 and the nut 5 is a washer 6 having a concave spherical end face. The spherical faces of the nut 5 and of the washer 6 are in facing engagement. The washer 6 is provided with a conical bore which is adapted to the bore of the metal plate 1. The bottom end of the anchor bolt 4 is provided with a heavy tension pin 7 upon which the nut 5 is threadedly mounted. On the upper end of the pipe 2 there is provided a metal plate 8 which is tacked thereon in such a way that the upper edge of the metal plate 8 is flush with the upper end of the pipe 2. Into the metal plate 8 there are screwed carrying bolts 9 which are designed at the upper ends thereof as hexagonal pins 10. The end face of each hexagonal pin 10 is slightly crowned. Beneath the bores in metal plate 8 within which the carrying bolts 9 are engaged there are provided welded metal hoods 11. On the upper end of the anchor bolt 4 there is screwed a clamping nut 13. Compensating means are provided between the clamping nut 13 and the machine base 12. The compensating means arranged between the clamping nut 13 and the machine base 12 comprise a pair of rings 14 having a wedge-shaped cross sectional configuration taken in the axial direction thereof.

The machine is located in place upon the foundation by means of rollers or by a similar gliding movement on prepared beams. Before the machine is located upon the foundation, the anchor bolt 4 is completely sunk in pipe 2 so that only the carrying bolts 9 project from the foundation. The bolts 9 extend above the upper level of the foundation to only a small height such that no interference will be created obstructing or preventing the rolling or gliding of the machine in place. The rollers or beams which are utilized to move the machine in place are configured with a height suitable to prevent interference with the movement of the machine by the bolts 9. The machine is lowered by means of jacks until the machine base 12 rests upon the carrying bolts 9. Due to the weight of the machine, the contacting or tacking points are detached. This is accomplished intentionally since the concrete will show some shrinkage upon hardening to that the pipe 2 must first absorb the supporting force. Due to the detachment of the tacking points, the metal plates 1 and 8 clamp or compress the concrete so that the latter will now absorb the supporting force for the machine. By turning the carrying bolts 9, the machine may be positioned adjusted and exactly aligned in its appropriate location.

After this alignment, the anchor bolt 4 is raised through the bore in the machine base to an extent sufficient that the washer 6 is pressed by the nut 5 against the metal plate 1.

The anchor bolt 4 may also be conducted through the machine base 12 if the bore of the machine base 12 is not centrally located above the pipe 2. The two rings 14, whose cross sectional configuration is wedge-shaped in the axial direction, are then pushed over the upper end of the anchor bolt 4 and the clamping nut 5 is screwed in place. The rings 14 are turned relative to each other so that the bottom ring 14 bears with the entire surface on the machine base 12 and clamping nut 13 with its entire surface on the upper ring 14 to distribute the force over as large an area as possible. Since the rings can not be turned to the bottom end of the anchor bolt 4 due to the lack of accessibility, the changed position of the anchor bolt 4 is compensated by the spherical surfaces of the nut 5 and the washer 6. Clamping nut 13 is tightened to such an extent that the machine is firmly anchored on the foundation. The tension pin 7 provides the function of preventing the nut 5 from turning relative to the anchor bolt 4. Since it must be possible to screw the carrying bolts 9 farther into the metal plate 8 during the alignment of the machine, it is necessary to provide a cavity beneath the bores in the metal plate 8 within which the bolts 9 are located. To this end, the metal caps 11 are provided in order to enable the bolts 9 to extend to beneath the plate 8. In order to achieve a centering action of the force upon the carrying bolts 9, the upper end faces of the carrying bolts are slightly crowned.

Before the foundation anchor is inserted into the pipe 2, it is closed with a cover to prevent contamination or fouling. The cover is removed only during the assembly operations. After the machine is firmly anchored upon the foundation, the upper cavity of the pipe 2 is preferably filled with a material which may be subsequently easily removed, if necessary. The material utilized for this purpose may, for example, be sand and polyurethane foam is also particularly suitable.

The present invention enables the insertion of the foundation anchors during the pouring of the foundation. This eliminates the elaborate calculations and operations which would otherwise be necessary in the subsequent insertion of the foundation anchors. By inserting the foundation anchors directly during the pouring of the foundation the separate inserting operations are eliminated thereby enabling a saving in time of about four weeks. Another essential advantage is the extremely wide tolerance range of the foundation anchors which enables compensation for deviations in any direction. This eliminates dimensional deviations which would not otherwise be compensated and as a result thereof the renewed insertion of a foundation anchor.

While a specific embodiment of the invention has been shown and described in detail to illustrate the application of the invention principles, it will be understood that the invention may be embodied otherwise without departing from such principles.

What is claimed is:

1. A foundation anchor assembly for fastening machines upon a foundation by attachment of said anchor assembly between said foundation and a base of said machine, said assembly comprising, in combination: a generally cylindrical vertically oriented pipe member defining an opening extending downwardly into said foundation to a given depth; a first plate member extending transversely across said pipe member through said opening at a location intermediate the depth thereof, said first plate member extending laterally beyond said pipe member in an embedded position within said foundation; means defining an orifice through said first plate member; an anchor bolt having a bottom end and a top end, said anchor bolt extending with said bottom end below said first plate member through said orifice in said first plate member and with said top end above said machine base through an opening in said machine base; universal joint means attaching said bottom end of said anchor bolt to said first plate member, said universal joint means comprising a washer extending about said orifice on the underside of said first plate member, said washer having a downwardly directed arcuate surface, a nut attached to said bottom end of said anchor bolt having an upwardly directed arcuate surface in sliding engagement with said downwardly directed arcuate surface of said washer, said universal joint means constituting a slued connection enabling pivotal movement of said anchor bolt thereabout; adjustment means for adjustably positioning over said opening the base of a machine to be fastened upon said foundation by said foundation anchor assembly, said adjustment means comprising a second plate member extending about the upper end of said pipe member and embedded in said foundation adjacent the upper surface thereof, and a plurality of carrying bolts threadedly engaged within said second plate member and extending upwardly therefrom with a crowned top for engagement with the underside of said machine base; a clamping nut attaching said top end of said anchor bolt to the upper side of said machine base; and compensating means comprising a pair of rings having a wedge-shaped sectional configuration taken in the axial direction thereof, said compensating means being interposed between said clamping nut and said machine base.

2. An anchor assembly according to claim 1 further comprising a plurality of metal caps embedded within said foundation beneath said second plate member, said metal caps being located directly beneath each of said carrying bolts in order to define beneath each carrying bolt a hollow space within which said carrying bolts may extend during threaded adjustment thereof relative to said second plate member.

* * * * *